United States Patent
Li et al.

(10) Patent No.: US 12,525,606 B2
(45) Date of Patent: Jan. 13, 2026

(54) POSITIVE ELECTRODE SHEET AND BATTERY

(71) Applicant: Zhuhai CosMX Battery Co., Ltd., Zhuhai (CN)

(72) Inventors: Genzong Li, Zhuhai (CN); Chong Peng, Zhuhai (CN)

(73) Assignee: Zhuhai CosMX Battery Co., Ltd., Zhuhai (CN)

( * ) Notice: Subject to any disclaimer, the term of this patent is extended or adjusted under 35 U.S.C. 154(b) by 767 days.

(21) Appl. No.: 17/811,475

(22) Filed: Jul. 8, 2022

(65) Prior Publication Data

US 2022/0344645 A1    Oct. 27, 2022

Related U.S. Application Data

(63) Continuation of application No. PCT/CN2021/116763, filed on Sep. 6, 2021.

(30) Foreign Application Priority Data

Sep. 21, 2020 (CN) .......................... 202010995089.5

(51) Int. Cl.
 *H01M 10/0525* (2010.01)
 *H01M 4/36* (2006.01)
 *H01M 4/02* (2006.01)

(52) U.S. Cl.
 CPC ....... *H01M 4/366* (2013.01); *H01M 10/0525* (2013.01); *H01M 2004/021* (2013.01); *H01M 2004/027* (2013.01); *H01M 2004/028* (2013.01)

(58) Field of Classification Search
 None
 See application file for complete search history.

(56) References Cited

U.S. PATENT DOCUMENTS

| | | | |
|---|---|---|---|
| 2008/0311479 A1* | 12/2008 | Lee | H01M 4/13 429/232 |
| 2018/0219251 A1 | 8/2018 | Rogren | |
| 2020/0020937 A1* | 1/2020 | Yao | H01M 4/366 |

FOREIGN PATENT DOCUMENTS

| | | |
|---|---|---|
| CN | 101313428 A | 11/2008 |
| CN | 103102717 A | 5/2013 |

(Continued)

OTHER PUBLICATIONS

First Office Action dated May 10, 2021 from China National Intellectual Property Administration for Chinese application No. 202010995089.5.

(Continued)

*Primary Examiner* — Jeffrey T Barton

(57) ABSTRACT

Provided in the present application are a positive electrode sheet and a battery. The positive electrode sheet includes a positive electrode current collector, a first coated area, a second coated area, and a third coated area are included on one side or two sides of the positive electrode current collector, and the first coated area, the second coated area, and the third coated area are distributed in a first direction, the first direction is a length direction of the positive electrode current collector; the second coated area is disposed between the first coated area and the third coated area in a width direction of the positive electrode current collector; the first coated area and the third coated area are coated with a positive electrode active material layer, the second coated area is coated with a porous material layer.

17 Claims, 1 Drawing Sheet

(56) References Cited

FOREIGN PATENT DOCUMENTS

| | | |
|---|---|---|
| CN | 103247779 A | 8/2013 |
| CN | 107170987 A | 9/2017 |
| CN | 107256971 A | 10/2017 |
| CN | 108511679 A | 9/2018 |
| CN | 109148823 A | 1/2019 |
| CN | 109148888 A | 1/2019 |
| CN | 109256523 A | 1/2019 |
| CN | 109390554 A | 2/2019 |
| CN | 208806302 U | 4/2019 |
| CN | 209045678 U | 6/2019 |
| CN | 110052364 A | 7/2019 |
| CN | 110416488 A | 11/2019 |
| CN | 110612622 A | 12/2019 |
| CN | 111554982 A | 8/2020 |
| CN | 112018397 A | 12/2020 |
| JP | H10270021 A | 10/1998 |
| KR | 20190127146 A | 11/2019 |
| WO | WO2017214247 A1 | 12/2017 |
| WO | WO2018087427 A1 | 5/2018 |
| WO | WO2019053408 A1 | 3/2019 |

OTHER PUBLICATIONS

Notification to Grant Patent Right dated Nov. 5, 2021 from China National Intellectual Property Administration for Chinese application No. 202010995089.5.

International Search Report dated Jan. 27, 2022 for International Application No. PCT/CN2021/128128.

* cited by examiner

POSITIVE ELECTRODE SHEET AND BATTERY

CROSS-REFERENCE TO RELATED APPLICATIONS

The present application is a continuation of International Application No. PCT/CN2021/116763, filed on Sep. 6, 2021, which claims priority to Chinese Patent Application No. 202010995089.5 filed with the China National Intellectual Property Administration on Sep. 21, 2020 and entitled "positive electrode sheet and battery". The disclosures of the aforementioned applications are hereby incorporated by reference in their entireties.

TECHNICAL FIELD

The present application belongs to the technical field of lithium-ion batteries and, in particular, relates to a positive electrode sheet and a battery.

BACKGROUND

Today, lithium-ion batteries are widely used in all walks of life as an environmentally friendly green energy source. Consumer electronic products have higher and higher requirements for working life and rapid charging ability of lithium secondary batteries. To meet customer needs, the capacity of lithium-ion batteries is getting greater, and the charging rate is constantly increasing.

In the prior art, for an electrode sheet of a lithium-ion battery, it usually needs to coat a layer of active material on a surface of the electrode sheet, and the ion exchange between a positive electrode active material and a negative electrode active material of a positive electrode sheet and a negative electrode sheet realizes charging and discharging. However, when the battery capacity increases and the charging rate increases, it is easy to cause the temperature of the electrode sheets of the lithium-ion battery to increase during the charging and discharging process, which will cause thermal runaway and result in safety problem. It may be seen that the safety of batteries in the prior art is low.

SUMMARY

Embodiments of the present application provide a positive electrode sheet and a battery to solve the problem of low safety of batteries in the prior art.

In a first aspect, an embodiment of the present application provides a positive electrode sheet including a positive electrode current collector, a first coated area, a second coated area, and a third coated area are included on one side or two sides of the positive electrode current collector, and the first coated area, the second coated area, and the third coated area are distributed in a first direction, the first direction is a length direction of the positive electrode current collector; the second coated area is disposed between the first coated area and the third coated area in a width direction of the positive electrode current collector;

the first coated area and the third coated area are coated with a positive electrode active material layer, the second coated area is coated with a porous material layer, the porous material layer has a pore size of greater than 50 nm, and a porosity of greater than 30%.

Optionally, the porous material layer includes a porous insulating material and a binder; or, an inorganic ion material and a binder; or, a porous insulating material, an inorganic ion material and a binder.

Optionally, the porous material layer includes a ceramic powder, an inorganic ion material, and a binder, and a mass ratio of the ceramic powder, the inorganic ion material, and the binder is (70%-95%):(5%-20%):(0%-10%).

Optionally, the ceramic powder has a particle size of 0.5-50 μm.

Optionally, a coated width of the first coated area is equal to a coated width of the third coated area, and a ratio of a coated width of the second coated area to the coated width of the first coated area is 1/40-3/8.

In the second aspect, an embodiment of the present application further provide a battery including a negative electrode sheet, a separation film, and the positive electrode sheet as described in any one of the above.

Optionally, the negative electrode sheet includes a negative electrode current collector, a fourth coated area, a fifth coated area, and a sixth coated area are included on one side or two sides of the negative electrode current collector, and the fourth coated area, the fifth coated area, and the sixth coated area are distributed in a second direction, the second direction is a length direction of the negative electrode current collector, the fifth coated area is disposed between the fourth coated area and the sixth coated area;

the fourth coated area and the sixth coated area are coated with a first negative electrode active material layer, the fifth coated area is coated with a second negative electrode active material layer, and a mass ratio of a conductive agent in the second negative electrode active material layer is greater than a mass ratio of a conductive agent in the first negative electrode active material layer.

Optionally, the second negative electrode active material layer includes the conductive agent, a negative electrode active material, and a binder, and a mass ratio of the conductive agent, the negative electrode active material, and the binder is (50%-90%):(0%-20%):(5%-15%).

Optionally, the conductive agent and the negative electrode active material have a particle size of 15-50 μm.

Optionally, a length of the positive electrode current collector is less than or equal to a length of the negative electrode current collector, a width of the positive electrode current collector is less than or equal to a width of the negative electrode current collector, the coated width of the second coated area is less than or equal to a coated width of the fifth coated area; the second coated area and the fifth coated area are disposed opposite to each other.

In embodiments of the present application, on the current collector of the positive electrode sheet, the first coated area, the second coated area, and the third coated area are coated in the length direction, the first coated area and the third coated area are coated with a positive electrode active material, the second coated area is disposed between the first coated area and the third coated area, and is the porous material layer. Since a large porosity material of the porous material layer can effectively increase heat dissipation area, and meanwhile, since the content of the positive electrode active material decrease, which may also decreases the internal resistance of the electrode sheet, the resistance heat of the battery itself increased due to the internal resistance in the charging and discharging process can be effectively reduced and the heat dissipation efficiency can be improved during the charging and discharging cycle process. Therefore the safety problem, caused by the instability of an electrochemical system caused by the excessive temperature during the charging and discharging cycle process can be avoided, thereby improving the safety of the battery.

DESCRIPTION OF EMBODIMENTS

The technical solutions in embodiments of the present application will be described clearly and comprehensively in combination with the accompanying drawings in embodiments of the present application. Apparently, the described embodiments are a part rather than all embodiments of the present application. Based on embodiments in the present application, all other embodiments obtained by those of ordinary skill in the art without creative effort shall fall within the protection scope of the present application.

Figure 1:
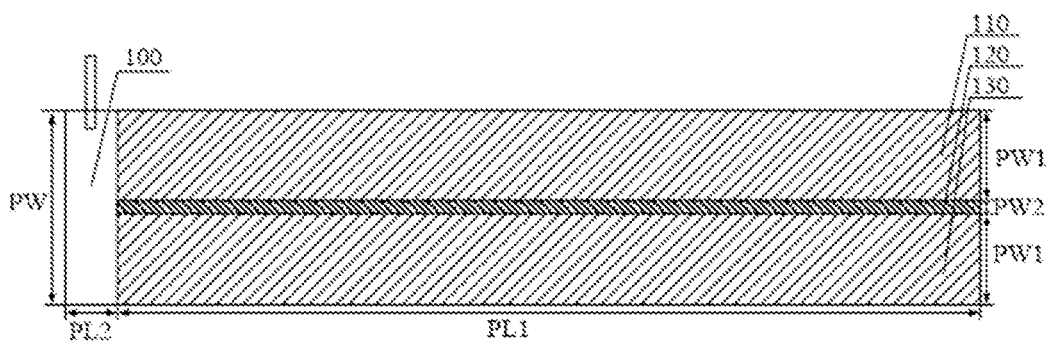
FIG. 1 is a schematic structural diagram of a positive electrode sheet provided by an embodiment of the present application.

Referring to FIG. 1, an embodiment of the present application provides a positive electrode sheet including a positive electrode current collector 100, a first coated area 110, a second coated area 120, and a third coated area 130 are included on one side or two sides of the positive electrode current collector 100, and the first coated area 110, the second coated area 120, and the third coated area 130 are distributed in a first direction, the first direction is a length direction of the positive electrode current collector 100; the second coated area 120 is disposed between the first coated area 110 and the third coated area 130 in a width direction of the positive electrode current collector;

the first coated area 110 and the third coated area 130 are coated with a positive electrode active material layer, the second coated area 120 is coated with a porous material layer, the porous material layer has a pore size of greater than 50 nm, and a porosity of greater than 30%.

In an embodiment of the present application, the above-mentioned positive electrode current collector 100 may be an aluminum foil. In a battery, the above-mentioned positive electrode current collector 100 is spirally wound into a portion of a winding core of the battery. A length direction of the above-mentioned positive electrode current collector 100 may be a winding direction of the above-mentioned positive electrode current collector 100 or a direction opposite to the winding direction. The above-mentioned first coated area 110, the second coated area 120, and the third coated area 130 are all coated in the above-mentioned first direction.

Where the above-mentioned porous material layer may include insulating materials such as a ceramic powder or a resin material, may also be a macroporous positive electrode active material, etc., and may include a porous ceramic insulating material and/or an inorganic ion material, so that the insulating and flame-retardant effects may be achieved at the same time, which is not further limited here.

To improve the electrolytic solution storage ability of the above-mentioned porous material layer and to increase heat dissipation area at the same time, the above-mentioned porous material layer may has a pore size of greater than 50 nm, and a porosity of greater than 30%.

Specifically, the above-mentioned positive electrode active material layer may include one or more of lithium phosphate cobaltate, lithium nickel cobalt manganate, lithium iron phosphate, lithium nickel cobalt aluminate, or lithium iron manganese phosphate, which are common positive electrode active materials for lithium-ion batteries, and the above-mentioned positive electrode active material layer may further include materials such as a conductive agent and a binder, etc.

Where the above-mentioned binder may be selected from a group consisting of polyvinylidene fluoride, vinylidene fluoride-hexafluoropropylene copolymer, polyamide, polyacrylonitrile, polyacrylate, polyacrylic acid, polyacrylic acid salt, sodium carboxymethyl cellulose, polyvinylpyrrolidone, polyvinyl ether, polymethyl methacrylate, polytetrafluoroethylene, polyhexafluoropropylene, styrene butadiene rubber, and a combination thereof.

In an embodiment of the present application, on the current collector of the positive electrode sheet, the first coated area 110, the second coated area 120, and the third coated area 130 are coated in the length direction, the first coated area 110 and the third coated area 130 are coated with the positive electrode active material, the second coated area 120 is disposed between the first coated area 110 and the third coated area 130, and is the porous material layer. Since a large porosity material of the porous material layer can effectively increase heat dissipation area, and meanwhile, since the content of the positive electrode active material decrease, which may also decrease the internal resistance of the electrode sheet, the resistance heat of the battery itself increased due to the internal resistance in the charging and discharging process can be effectively reduced and the heat dissipation efficiency can be improved during the charging and discharging cycle process. Therefore the safety problem, caused by the instability of an electrochemical system caused by the excessive temperature during the charging and discharging cycle process can be avoided, thereby improving the safety of the battery.

It needs to be noted that since the macroporous porous material layer, compared with the positive electrode active material layer, has more space capacity to store an electrolytic solution, it is thus beneficial to improve the cycle life of the battery during using process, that is, with the increase of the number of cycles, the extent of the reduction of the capacity retention rate is reduced.

Further, the porous material layer may include a porous insulating material and a binder, or an inorganic ion material and a binder.

Since when a short circuit occurs in a positive electrode sheet, local thermal runaway may be caused, thereby causing an electrode sheet to burn. In an embodiment of the present application, the above-mentioned porous material layer may include the porous insulating material and the binder, so that an insulating zone is formed in the positive electrode active material in the first coated area 110 and the third coated area 130. When the short circuit occurs, the inorganic ion material in the porous material layer may have a flame-retardant effect, reduce the risk of thermal runaway, and further improve the safety of the battery.

It may be understood that, in order to achieve the above-mentioned flame-retardant effect, the above-mentioned porous material layer may also include the inorganic ionic material and the binder.

Optionally, the porous material layer includes the ceramic powder, the inorganic ion material, and the binder, and a mass ratio of the ceramic powder, the inorganic ion material, and the binder is (70%-95%):(5%-20%):(0%-10%).

In an embodiment of the present application, the above-mentioned porous material layer may include two porous insulating materials of the ceramic powder and the inorganic ion material, and the adhesion between particles is achieved through the binder. A mass percentage of the above-mentioned ceramic powder may be 70%-95%, preferably 85%-

90%. Correspondingly, a mass percentage of the above-mentioned inorganic ion material may be 5%-20%, preferably 10%-15%. A mass percentage of the above-mentioned binder may be 0%-10%, preferably 3%-5%.

Specifically, the above-mentioned inorganic ion material may be selected from a group consisting of aluminum oxide, silicon dioxide, magnesium oxide, titanium oxide, hafnium dioxide, tin oxide, cerium dioxide, nickel oxide, zinc oxide, calcium oxide, zirconium dioxide, yttrium oxide, silicon carbide, boehmite, magnesium hydroxide, calcium hydroxide, aluminum hydroxide, barium sulfate, and a combination thereof.

Further, the ceramic powder may have a particle size of 0.5-50 μm, preferably 10-30 μm.

Further, in order to ensure the uniform heat dissipation of the above-mentioned first coated area 110 and the above-mentioned third coated area 130, that is, in order to ensure that the temperature distribution of the entire positive electrode sheet is relatively uniform, a coated width of the first coated area 110 is equal to a coated width of the third coated area 130.

Specifically, since a coated width of the second coated area 120 is wider, the heat dissipation ability will be better, but the coated widths of the first coated area 110 and the third coated area 130 will correspondingly become narrower, the positive electrode active material will be reduced, and the battery capacity will be reduced accordingly. Therefore, the coated widths of the above-mentioned first coated area 110 and the second coated area 120 may be set according to practical needs. In an embodiment of the present application, a ratio of the coated width of the second coated area 120 to the coated width of the first coated area 110 may be 1/40-3/8.

It needs to be noted that in the above-mentioned positive electrode sheet, the positive electrode active material may be completely coated at first, and then the coated electrode sheet is laser cleaned along a middle portion thereof to form an empty foil area. The porous material layer is coated on the empty foil area, so that the above-mentioned second coated area 120 may be formed, and the original positive electrode active material is separated into the first coated area 110 and the third coated area 130.

In a second aspect, an embodiment of the present application further provides a battery including a negative electrode sheet, a separation film, and the positive electrode sheet as described in any one of the above-mentioned embodiments.

Figure 2:
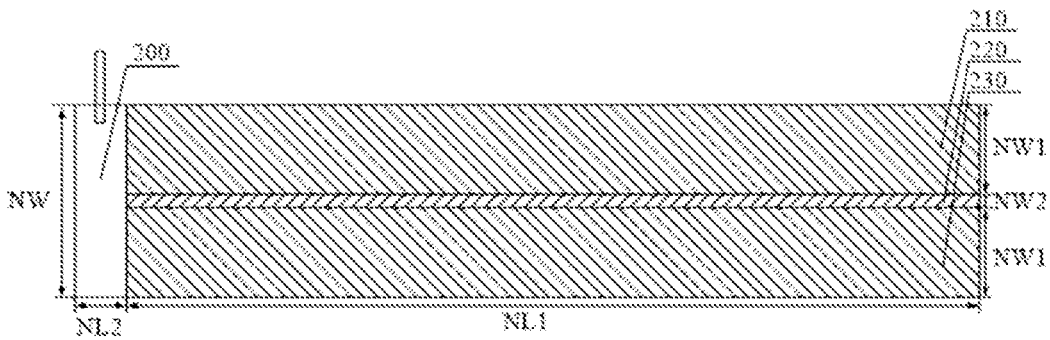
FIG. 2 is a schematic structural diagram of a negative electrode sheet provided by an embodiment of the present application.

Further, referring to FIG. 2, the negative electrode sheet includes a negative electrode current collector 200, a fourth coated area 210, a fifth coated area 220, and a sixth coated area 230 are included on one side or two sides of the negative electrode current collector 200, and the fourth coated area 210, the fifth coated area 220, and the sixth coated area 230 are distributed in a second direction, the second direction is a length direction of the negative electrode current collector 200; the fifth coated area 220 is disposed between the fourth coated area 210 and the sixth coated area 230 in a width direction of the negative electrode current collector;

the fourth coated area 210 and the sixth coated area 230 are coated with a first negative electrode active material layer, the fifth coated area 220 is coated with a second negative electrode active material layer, and a mass ratio of a conductive agent in the second negative electrode active material layer is greater than a mass ratio of the conductive agent in the first negative electrode active material layer.

In an embodiment of the present application, since the positive electrode sheet and the negative electrode sheet in the battery are usually disposed opposite to each other, the reaction between the positive electrode active material and the negative electrode active material is realized. Since the second coated area 120 of the above-mentioned positive electrode sheet is the porous material layer, the fifth coated area 220 of the negative electrode sheet at a corresponding position may not be coated with or coated with less negative electrode active material, therefore, the battery capacity cannot be further reduced.

Similar to the above-mentioned positive electrode sheet, in the battery, the positive electrode sheet and the negative electrode sheet are spirally wound to form a winding core of the battery. The above-mentioned second direction may be a winding direction of the above-mentioned negative electrode sheet or a direction opposite to the winding direction.

Specifically, the fifth coated area 220 may be coated with more conductive agent, so that the dynamic performance of a negative electrode may be effectively improved, which is beneficial to meet requirements of a rapid charging system.

Further, the second negative electrode active material layer may include the conductive agent, a negative electrode active material, and a binder, and a mass ratio of the conductive agent, the negative electrode active material, and the binder is (50%-90%):(0%-20%):(5%-15%).

Where the above-mentioned negative electrode current collector 200 may be copper foil, microporous copper foil, or carbon-coated copper foil. The above-mentioned negative electrode active material may include one or more of graphite, hard carbon and artificial graphite. A mass percentage of the above-mentioned binder may be 50%-90%, preferably 70%-80%. A mass percentage of the above-mentioned negative electrode active material may be 0%-20%, preferably 10%-15%. A mass percentage of the above-mentioned binder may be 5%-15%, preferably 8%-10%.

Further, in order to improve the capacity of the negative electrode sheet for an electrolytic solution, the conductive agent and the negative electrode active material may be a large-particle material. Specifically, the particle size of the conductive agent may be 15-50 μm; and/or, the particle size of the negative electrode active material may be 15-50 μm.

Further, in order to reduce the risk of lithium plating of the battery, the negative electrode capacity of the above-mentioned negative electrode sheet needs to be slightly larger than the positive electrode capacity of the above-mentioned positive electrode sheet. Therefore, the length of the positive electrode current collector 100 is less than or equal to the length of the negative electrode current collector 200, the width of the positive electrode current collector 100 is less than or equal to the width of the negative electrode current collector 200, the coated width of the second coated area 120 is less than or equal to the coated width of the fifth coated area 220; the second coated area 120 and the fifth coated area 220 are disposed opposite to each other.

In the above-mentioned negative electrode sheet, the first negative electrode active material may also be completely coated at first, and then the coated electrode sheet is laser cleaned along a middle portion thereof to form an empty foil area. The second active material is coated on the empty foil area, so that the above-mentioned fifth coated area 220 may be formed, and the original negative electrode active material is separated into the above-mentioned fourth coated area 210 and the sixth coated area 230.

Further, the separation film in the above-mentioned battery may be a lithium-ion battery separation film such as a water system separation film, a macroporous oil system separation film, and an intaglio oil system separation film. A method of combining the above-mentioned negative electrode sheet, the positive electrode sheet, and the separation film to form a battery may be: making the above-mentioned positive electrode and the negative electrode coordinate with rolling—cutting—sheeting—spirally winding—packaging—roasting and injecting liquid—forming—second packaging—sorting to obtain the above-mentioned battery. The rolling—cutting—sheeting—spirally winding—packaging—roasting and injecting liquid—forming—second packaging—sorting may all adopt conventional technical means in the art.

In the following, specific embodiments will be used to describe implementation ways of the present application in detail.

"positive electrode active material and negative electrode active material", "binder", "separation film", "conductive agent", "current collector" involved in the following specific embodiments are all conventional materials in lithium-ion batteries; the involved "drying, rolling, cutting, sheeting" may all be conventional technical means for preparing a lithium-ion battery in the art.

Example 1

The present example provides a lithium-ion battery that reduces temperature rise and increases life cycle, and a specific method is as follows:

using a mixture composed of 97.8% of lithium cobaltate, 1.1% of a conductive agent and 1.1% of a binder, uniformly dispersing in an N-methylpyrrolidone (NMP) solvent to prepare a positive electrode slurry P-A; placing the slurry P-A in a coater for coating, in which a coating method includes one of extrusion coating, transfer coating, and roll coating, and laser cleaning the coated electrode sheet on an empty foil area with a width of PW2, coating the empty foil area with a slurry P-B made of 85% of a ceramic powder, 10% of an inorganic ion material, and 5% of a binder to obtain a positive electrode sheet; using a mixture composed of 96.5% of graphite, 0.5% of a conductive agent and 3% of a binder, uniformly dispersing in the NMP solvent to prepare a negative electrode slurry N-A; placing the slurry N-A in the coater for coating, in which a coating method includes one of extrusion coating, transfer coating, and roll coating, and laser cleaning the coated electrode sheet on an empty foil area with a width of NW2, coating the empty foil area with a slurry N-B made of 80% of a conductive agent, 12% of hard carbon and 8% of a binder to obtain a negative electrode sheet; drying and rolling the positive electrode sheet and the negative electrode sheet, then the required positive electrode sheet may be obtained. In the present example, PW2/PW1=⅛, NW2/NW1=3/20, ceramic particles have a diameter of 20 micrometers, and a large-particle material has a diameter of 30 micrometers.

Further, the lithium-ion battery is obtain by using common methods in the art via making the above-mentioned positive electrode and the negative electrode coordinate with rolling—cutting—sheeting—spirally winding—packaging—roasting and injecting liquid—forming—second packaging—sorting. The rolling—cutting—sheeting—spirally winding—packaging—roasting and injecting liquid—forming—second packaging—sorting may all adopt conventional technical means in the art.

Example 2

The present example provides a lithium-ion battery that reduces temperature rise and increases life cycle, and the difference from Example 1 is that the diameter of the ceramic particles is 25 micrometers.

Example 3

The present example provides a lithium-ion battery that reduces temperature rise and increases life cycle, and the difference from Example 1 is that the diameter of the ceramic particles is 30 micrometers.

Comparative Example 1

The present example provides a lithium-ion battery, and the difference from Example 1 is that there is no empty foil coated area in the middle.

The most conventional method is used to perform a normal temperature cycle test of the above-mentioned batteries: 25° C., 1.5 C/1 C for cycling 100 times and 300 times, testing the temperature rise. The test method is: fully charging the lithium-ion battery at 1.5 C to a rated voltage and then discharging at 1 C at 25° C., and both charging and discharging are terminated at 0.05 C. The specific results are as Table 1:

TABLE 1

| | 25° C., 1.5 C/1 C | | | |
| --- | --- | --- | --- | --- |
| | Capacity retention rate | | Temperature rise status | |
| Cycle time | 100 T | 300 T | 1 T | 100 T |
| Example 1 | 98.10% | 93.39% | 30° C. | 32° C. |
| Example 2 | 98.97% | 94.54% | 30° C. | 32° C. |
| Example 3 | 99.31% | 95.25% | 29° C. | 30° C. |
| Comparative Example 1 | 95.54% | 85.2% | 35° C. | 39° C. |

It may be seen from the above table that compared with Comparative Example 1, the retention rate for 100 times cycle and 300 times cycle in Examples 1, 2, 3 is better, indicating that the method of coating a porous material in the empty foil left in the middle of the electrode sheet may effectively improve the cycle performance of the batteries. By testing the temperature rise of the batteries for cycling 1 time and 100 times, it is found that the temperature rise in Examples 1, 2, 3 is significantly lower than that in Comparative Example 1, indicating that the method of coating the porous material in the empty foil left in the middle of the electrode sheet may effectively reduce the temperature rise of the batteries.

The above are only specific embodiments of the present application, but the protection scope of the present application is not limited to these. Changes or substitutions in the technical scope disclosed in the present application that are easily to be thought of by any person skilled in the art may should all be covered within the protection scope of the present application. Therefore, the protection scope of the present application should be subject to the protection scope of the claims.

What is claimed is:

1. A positive electrode sheet comprising a positive electrode current collector, wherein a first coated area, a second coated area, and a third coated area are comprised on one side or two sides of the positive electrode current collector, and the first coated area, the second coated area, and the third coated area are distributed in a first direction, the first direction is a length direction of the positive electrode current collector; the second coated area is disposed between the first coated area and the third coated area in a width direction of the positive electrode current collector;

the first coated area and the third coated area are coated with a positive electrode active material layer, the second coated area is coated with a porous material layer, the porous material layer has a pore size of greater than 50 nm, and a porosity of greater than 30%;

wherein a coated width of the first coated area is equal to a coated width of the third coated area, and a ratio of a coated width of the second coated area to the coated width of the first coated area is 1/40-3/8.

2. The positive electrode sheet according to claim 1, wherein the porous material layer comprises a porous insulating material and a binder; or, an inorganic ion material and a binder; or, a porous insulating material, an inorganic ion material and a binder.

3. The positive electrode sheet according to claim 1, wherein the porous material layer comprises a ceramic powder, an inorganic ion material, and a binder, and a mass ratio of the ceramic powder, the inorganic ion material, and the binder is (70%-95%): (5%-20%): (0%-10%).

4. The positive electrode sheet according to claim 2, wherein the porous material layer comprises a ceramic powder, the inorganic ion material, and the binder, and a mass ratio of the ceramic powder, the inorganic ion material, and the binder is (70%-95%): (5%-20%): (0%-10%).

5. The positive electrode sheet according to claim 3, wherein the porous material layer comprises the ceramic powder, the inorganic ion material, and the binder, and the mass ratio of the ceramic powder, the inorganic ion material, and the binder is (85%-90%): (10%-15%): (3%-5%).

6. The positive electrode sheet according to claim 3, wherein the ceramic powder has a particle size of 0.5-50 μm.

7. The positive electrode sheet according to claim 4, wherein the ceramic powder has a particle size of 0.5-50 μm.

8. The positive electrode sheet according to claim 5, wherein the ceramic powder has a particle size of 0.5-50 μm.

9. The positive electrode sheet according to claim 6, wherein the ceramic powder has a particle size of 10-30 μm.

10. The positive electrode sheet according to claim 1, wherein along the length direction of the positive electrode current collector, each of the first coated area, the second coated area, and the third coated area is distributed continuously from one end of the positive electrode current collector to the other end of the positive electrode current collector.

11. A battery comprising a negative electrode sheet, a separation film, and the positive electrode sheet according to claim 1.

12. The battery according to claim 11, wherein the negative electrode sheet comprises a negative electrode current collector, a fourth coated area, a fifth coated area, and a sixth coated area are comprised on one side or two sides of the negative electrode current collector, and the fourth coated area, the fifth coated area, and the sixth coated area are distributed in a second direction, the second direction is a length direction of the negative electrode current collector; the fifth coated area is disposed between the fourth coated area and the sixth coated area in a width direction of the negative electrode current collector;

the fourth coated area and the sixth coated area are coated with a first negative electrode active material layer, the fifth coated area is coated with a second negative electrode active material layer, and a mass ratio of a conductive agent in the second negative electrode active material layer is greater than a mass ratio of a conductive agent in the first negative electrode active material layer.

13. The battery according to claim 12, wherein the second negative electrode active material layer comprises the conductive agent, a negative electrode active material, and a binder, and a mass ratio of the conductive agent, the negative electrode active material, and the binder is (50%-90%): (0%-20%): (5%-15%).

14. The battery according to claim 13, wherein the second negative electrode active material layer comprises the conductive agent, the negative electrode active material, and the binder, and the mass ratio of the conductive agent, the negative electrode active material, and the binder is (70%-80%): (10%-15%): (8%-10%).

15. The battery according to claim 13, wherein the conductive agent has a particle size of 15-50 μm; and/or, the negative electrode active material has a particle size of 15-50 μm.

16. The battery according to claim 14, wherein the conductive agent has a particle size of 15-50 μm; and/or, the negative electrode active material has a particle size of 15-50 μm.

17. The battery according to claim 12, wherein a length of the positive electrode current collector is less than or equal to a length of the negative electrode current collector, a width of the positive electrode current collector is less than or equal to a width of the negative electrode current collector, the coated width of the second coated area is less than or equal to a coated width of the fifth coated area; the second coated area and the fifth coated area are disposed opposite to each other.

* * * * *